United States Patent [19]
Warfield

[11] Patent Number: 5,754,760
[45] Date of Patent: May 19, 1998

[54] AUTOMATIC SOFTWARE TESTING TOOL

[75] Inventor: Robert W. Warfield, Aptos, Calif.

[73] Assignee: Integrity QA Software, Inc., Campbell, Calif.

[21] Appl. No.: 655,149

[22] Filed: May 30, 1996

[51] Int. Cl.$^6$ .................................................. G06F 11/00
[52] U.S. Cl. .................. 395/183.14; 395/183.11
[58] Field of Search ................... 395/183.13, 183.14, 395/702, 704, 183.01, 183.09, 183.08, 183.1, 183.11, 701; 364/267.19, 225.5

[56] References Cited

U.S. PATENT DOCUMENTS

| | | |
|---|---|---|
| 4,694,411 | 9/1987 | Burrows . |
| 4,809,202 | 2/1989 | Wolfram . |
| 4,972,334 | 11/1990 | Yamabe et al. . |
| 5,038,307 | 8/1991 | Krishnakumar et al. . |
| 5,045,994 | 9/1991 | Belfer ........................ 364/200 |
| 5,163,016 | 11/1992 | Har'El et al. . |
| 5,222,192 | 6/1993 | Shaefer ....................... 395/13 |
| 5,255,345 | 10/1993 | Shaefer ....................... 395/13 |
| 5,291,427 | 3/1994 | Loyer et al. . |
| 5,375,195 | 12/1994 | Johnston ...................... 395/135 |
| 5,394,347 | 2/1995 | Kita et al. . |
| 5,455,938 | 10/1995 | Ahmed ........................ 364/488 |
| 5,475,843 | 12/1995 | Halviatti ..................... 395/700 |
| 5,481,716 | 1/1996 | Morshedi ..................... 395/700 |
| 5,490,249 | 2/1996 | Miller ........................ 395/183.14 |
| 5,500,941 | 3/1996 | Gil ............................ 395/183.14 |
| 5,513,315 | 4/1996 | Tierney ....................... 395/183.13 |
| 5,539,680 | 7/1996 | Palnitkar ..................... 364/578 |
| 5,542,043 | 7/1996 | Cohen ......................... 395/183.08 |
| 5,548,718 | 8/1996 | Siegel ........................ 395/183.14 |
| 5,561,762 | 10/1996 | Smith ......................... 395/183.09 |
| 5,572,668 | 11/1996 | See ........................... 395/183.14 |
| 5,590,321 | 12/1996 | Lin ........................... 395/610 |

OTHER PUBLICATIONS

"Teradyne Introduces Automatic Test Generator for Software Systems," Oct. 23, 1995, by Mark Myers, 2 pages.
IEEE, Teradyne SST Autotestcon 95 Paper, "Automated Functional Test Generation," Aug. 1995, by Larry Apfelbaum, 11 pages.
1992 IEEE—"Axiomatic Test Sequence Generation for Extended Finite State Machines", pp. 252–259, *Chang–Jia Wang and Ming T. Liu.*
1990 IEEE—"An Improved Method for Automatic Validation of Communication Protocols", pp. 1885–1889, *Shwu Hwa S. Yu, Yew Wei Yae, and Ming T. Liu.*
1993 IEEE—"A Unified Approach to Protocol Test Sequence Generation", pp. 106–114, *Samuel T. Chanson and Jinsong Zhu.*

(List continued on next page.)

*Primary Examiner*—Albert Decady
*Attorney, Agent, or Firm*—Blakely, Sokoloff, Taylor & Zafman LLP

[57] ABSTRACT

A method of testing a software module using a genetic algorithm to generate a best test script is provided. The software module has a number of possible states. A set of state machines is created which represent a definition for either a user interface or an application program interface (API) of the software module in terms of the possible states. From the state machines, a set of test cases is automatically generated, such that each test case consists of code for manipulating the user interface or API. A genetic algorithm creates populations of test scripts from the test cases, in which each test script includes a number of test cases. Each test script from each successive generation of test scripts is executed by applying the script as input to the software module. A code coverage analyzer provides a measure of code coverage to the genetic algorithm for each test script. The genetic algorithm uses the measure of code coverage as a fitness value in generating future populations of test scripts and in determining a best script.

48 Claims, 11 Drawing Sheets

OTHER PUBLICATIONS

1989 IEEE—"Global State Graph Reduction Techniques for Protocol Validation in the EFSM Model", pp. 371–377, *Peil–Ying M. Chu and Ming T. Liu.*

IEEE, Proceedings: Symposium on Assessment of Quality Software Development Tools, "A Data Flow Coverage Testing Tool for C," J.R. Horgan and S. London, New Orleans, Louisiana, May 27–29, 1992, pp. 1–10.

IEEE, "Experience in Using Three Testing Tools for Research and Education in Software Engineering," Joseph R. Horgan, Aditya P. Mathur, Mar. 17, 1992, pp. 128–143.

AUTOMATIC SOFTWARE TESTING TOOL

FIELD OF THE INVENTION

The present invention pertains to the field of software testing. More particularly, the present invention relates to testing software in a manner which reduces manual programming and increases code coverage while accelerating the overall testing process.

BACKGROUND OF THE INVENTION

The cost of testing is a large component of the cost of producing software. In the past, testing of a software product often accounted for approximately one-third of the overall project cost. With the widespread adoption of graphical user interfaces (GUIs), the cost of testing may exceed half of the total project cost. The steadily increasing cost of testing has created a more urgent need for advancements in testing technology. Software testing tools, however, have thus far failed to keep pace with the needs of the industry.

Standard software testing tools include bug tracking databases, code coverage analyzers, and script automation systems. These tools have a number of inherent limitations. For instance, significant manual programming skills are required for many existing tools to be used effectively. Code coverage analyzers, generally provide little more than an abstract score of coverage, unless test personnel have sufficient knowledge and experience to analyze the code that was not covered and to create new test cases to execute that code. Consequently, software developers are sometimes forced to hire test personnel having substantial programming experience, which is often difficult. As a result, the overall cost of testing increases, which causes the overall cost of the product to increase.

Another limitation of testing tools is inherent in script automation systems. Script automation systems operate by running scripts that were created manually, either by directly typing them in or by "recording" the steps a user took and then playing them back at a later time using the script. This type of tool is essentially a "re-testing" tool, since the creation of the script involved putting the software being tested through the paces the script will eventually perform. It is normally at this initial point that bugs are detected. By the time the script is run, therefore, it can only detect new bugs in code that has already been tested, which is a difficult task.

In addition, many software testers lack the tools and knowledge to design adequate sets of test cases. Test cases may be limited to coverage of the user interface (UI), for example, because a complete state model of the software under test is not available. Such limited coverage tends to miss testing significant portions of the internal workings of the software. Because adequate code coverage often cannot be obtained by the vendor, therefore, vendor testing is often supplemented with extensive user testing. This process can be expensive and unpredictable and can lengthen the overall development cycle.

Another problem with existing software testing tools is that they are not integrated. In other words, existing tools are point solutions which do not provide any effective combined solution covering different phases of the testing process. Most notably, existing tools do not provide an integrated, automated solution to the processes of designing, coding, and debugging tests.

What is needed, therefore, is a software testing tool which overcomes these and other disadvantages of existing technology. In particular, what is needed is an automated software testing tool which reduces manual testing requirements while increasing code coverage. What is further needed is an automated software testing tool which provides an integrated, automated solution to the design, coding, and debugging of tests for software.

SUMMARY OF THE INVENTION

A method of testing machine-executable code which has a number of possible states is provided. In the method, a first set of input operations are generated based on a definition of the states. Each input operation includes machine-executable instructions for causing the code to enter various states. The code is then executed in response to the first set of input operations. Each of the input operations is assigned a fitness value based on the results of executing the code in response to that input operation. A second set of input operations is then generated from the first set of input operations based on the fitness values.

In one embodiment, the first and second sets of input operations are generated according to a genetic algorithm. In addition, in one embodiment, the fitness value corresponds to code coverage during execution of the code in response to each input operation.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

An automatic software testing tool which makes use of a genetic algorithm is described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to avoid unnecessarily obscuring the present invention.

The present invention includes an automatic software testing tool (ASTT). The ASTT includes various steps which may be embodied by computer program instructions. The instructions can be used to cause a general purpose processor which is programmed with the instructions to perform the required steps. Alternatively, the steps of the present invention may be performed by specific hardware components that contain hardwired logic for performing the required steps, or by any combination of programmed general purpose computer components and custom hardware components.

In general, the ASTT generates test scripts which are used to drive a user interface (UI) or one or more application program interfaces (APIs) of an application under test (AUT). In one embodiment of the present invention, the ultimate goal of the ASTT is to generate a test script which maximizes code coverage of the AUT using as few lines of script code as possible. In the preferred embodiment, the ASTT includes a genetic algorithm for generating the tests scripts.

Figure 1:
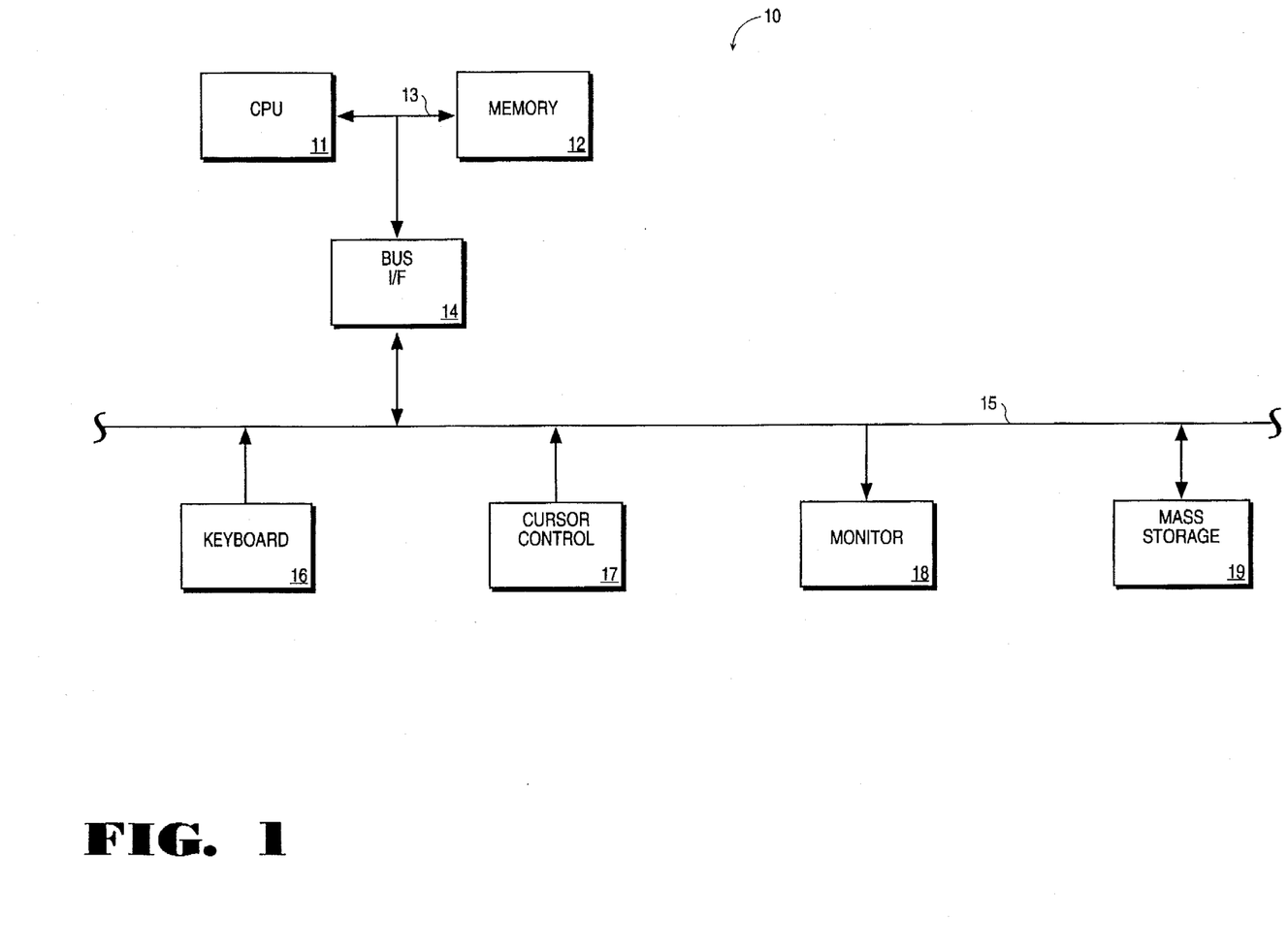
FIG. 1 is a block diagram of a computer system in which the present invention is implemented.

FIG. 1 illustrates a computer system 10 in which the present invention is implemented. Note that the architecture shown in FIG. 1 is provided only for purposes of illustration, and the present invention is not limited to this specific architecture. The computer system includes a central processing unit (CPU) 11, which is coupled to system memory 12 by a system bus 13. The system bus 13 is coupled to a peripheral bus 15 by a bus interface 14. Also coupled to the peripheral bus are a keyboard 16, a cursor control device 17, a monitor 18, and a mass storage device 19.

As mentioned above, the present invention is embodied by computer program instructions in the preferred embodiment. These computer program instructions may be stored in memory 12, in mass storage device 19, or both. Mass storage device 19 includes a storage medium, which may be based on magnetic, optical, or any equivalent storage technology.

Figure 2:
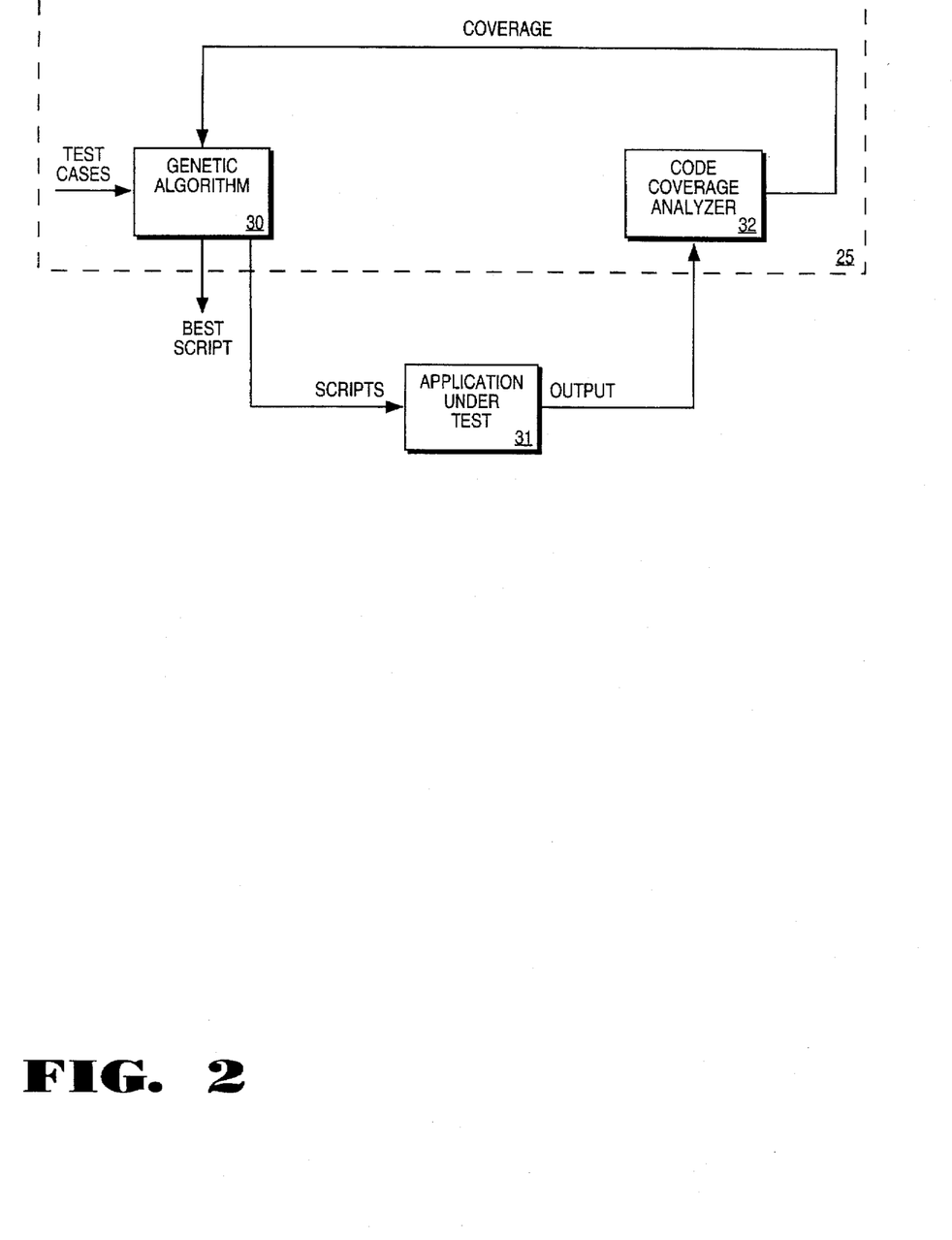
FIG. 2 is a block diagram illustrating the operation of an automatic software testing tool (ASTT) according to the present invention.

FIG. 2 is a block diagram illustrating the overall operation of an ASTT according to the present invention. In the preferred embodiment, the ASTT 25 includes a genetic algorithm 30 and a code coverage analyzer 32. The genetic algorithm 30 receives a number of test cases as input and uses the test cases to create a number of populations, which may also be referred to as "generations". Each population includes a number of members. Each member consists of both a test script and a corresponding fitness measure. In the embodiment of FIG. 2, the fitness measure is a code coverage value generated by the code coverage analyzer 32.

The basic operation of the genetic algorithm 30 includes an iterative process of creating a population, running the population in conjunction with the AUT 31, ranking the population by fitness, and then generating a new population. The fitness measures are used to indicate the performance of each script when executed against the AUT 31. In particular, a fitness measure is a number which indicates how close to achieving a defined goal (such as complete code coverage) the script has come. It is important to be able to measure this closeness, or at least to be able to compare the relative closeness of two different scripts.

Each test script comprises one or more test cases. A test case is the smallest verifiable operation which may be performed on the UI or API. Verification is done by the ASTT 25 by default as each test case is completed, but may optionally be performed at intermediate steps. The manner of generating the test cases is described below.

The process of running a population entails executing the AUT 31 in response to each test script in the population. In particular, each test script is used to drive the UI or an API of the AUT 31. In the preferred embodiment, the fitness measure is a code coverage value generated by code coverage analyzer 32. However, as will be described below, other types of fitness measures are possible. Code coverage analyzer 32 monitors the output of AUT 31 and determines the amount of code of AUT 31 that was executed in response to each test script. Code coverage analyzer 32 then provides to the genetic algorithm 30 a value (i.e., a fitness value) indicating the amount of code coverage. The genetic algorithm 30 generates the test scripts of each population based upon the previous population, including its fitness values, except in the case of the first population, which is generated randomly.

As mentioned, a fitness measure other than code coverage may be used. For example, a fitness measure can indicate data flow coverage, script length, load on a network or client server system, performance in general, or performance while achieving some predefined goal. Data flow coverage can be used as a fitness criterion by measuring the amount of coverage of a data set that the AUT 31 is executed upon. Load on a network or client server system can be used as a fitness measure by, for example, by executing the AUT 31 on a network server and assigning a higher degree of fitness to a script which places a relatively high load on the server yet has a relatively short length. In that case, the goal of the ASTT 25 might be to generate the shortest test script which creates an intolerable load on the server.

One embodiment of the present invention allows the fitness value to be passed back to the system via an API. This technique allows end users to create their own measure of performance independent of the measures built into the system, and to use the system to compute a script that optimizes that performance. For example, the script can be used to describe the set of actions necessary to adjust the tuning parameters of a database server. The API can be used to return a measure of improvement in execution speed for an existing database application. The system will adjust the tuning parameters until the execution speed has been improved as much as possible.

In another embodiment, code can be inserted to cause a code coverage seeking algorithm to test loop boundary conditions or to address other interesting test cases. To test loop boundary conditions, the user includes code that is executed only if the loop executes the boundary conditions. For example, the user can insert a counter variable into the loop, which determines how many times the loop executes. Following execution of the loop, different code statements would test whether the number of iterations matched each boundary condition to be tested. Therefore, the ASTT 25 will automatically be driven to produce scripts that test loop boundaries, because it is attempting to maximize code coverage. Other interesting test cases may be addressed simply by including code that tests whether the interesting event has occurred. A coverage-seeking algorithm will automatically force the code to produce the event of interest in order to attain coverage over the code that tests whether the event occurred.

In yet another embodiment, the fitness value can be based on mutation testing, a process in which bugs (errors) are intentionally inserted into the AUT 31. In such an embodiment, the fitness measure can be based on the number of bugs that are identified when the script is applied to the AUT 31.

As mentioned above, each test script comprises one or more test cases. Each test case is an independently verifiable operation. An example of a test case is the act of printing. A test case for printing must take the UI through all of the steps which are necessary to obtain output from a printer. Other types of test cases will test: menu commands; mouse gestures, such as selection or drawing; editing interactions, such as entering a name in a field; standard window interactions, such as resizing or scrolling a window; or OLE (Object Linking and Embedding) interactions.

Figure 4:
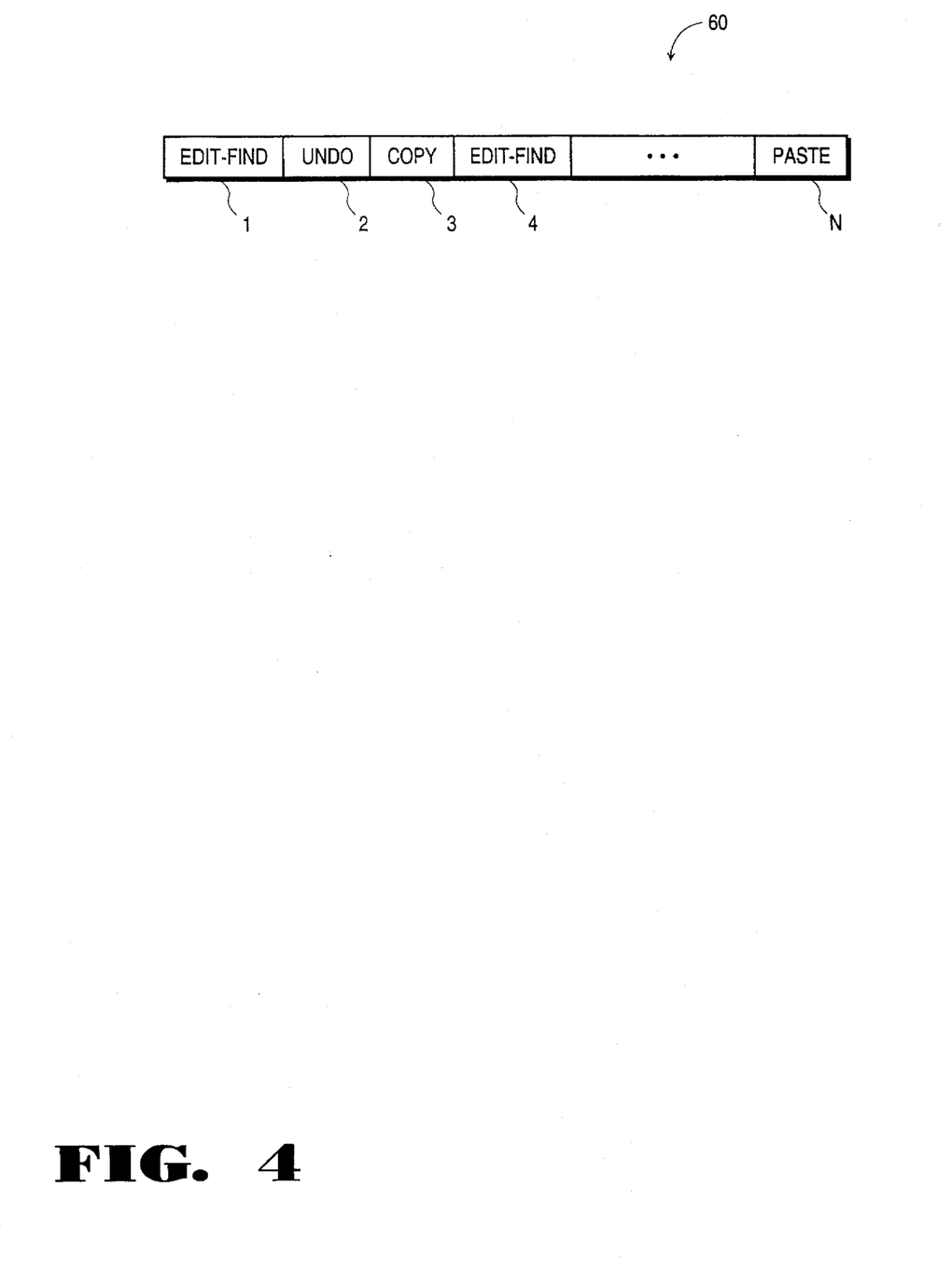
FIG. 4 illustrates a test script including a plurality of test cases.

FIG. 4 illustrates an example of a test script 60 which may be used to drive a UI. The test script 60 consists of a sequence of N test cases, as composed by the genetic algorithm 30. In FIG. 4, test cases 1 and 4 drive an Edit-Find command. The Edit-Find command is a well-known command for searching text, which is associated with UIs of many software applications. Test cases 2, 3, and N correspond to Undo, Copy, and Paste commands, which are also well-known commands.

Figure 6:
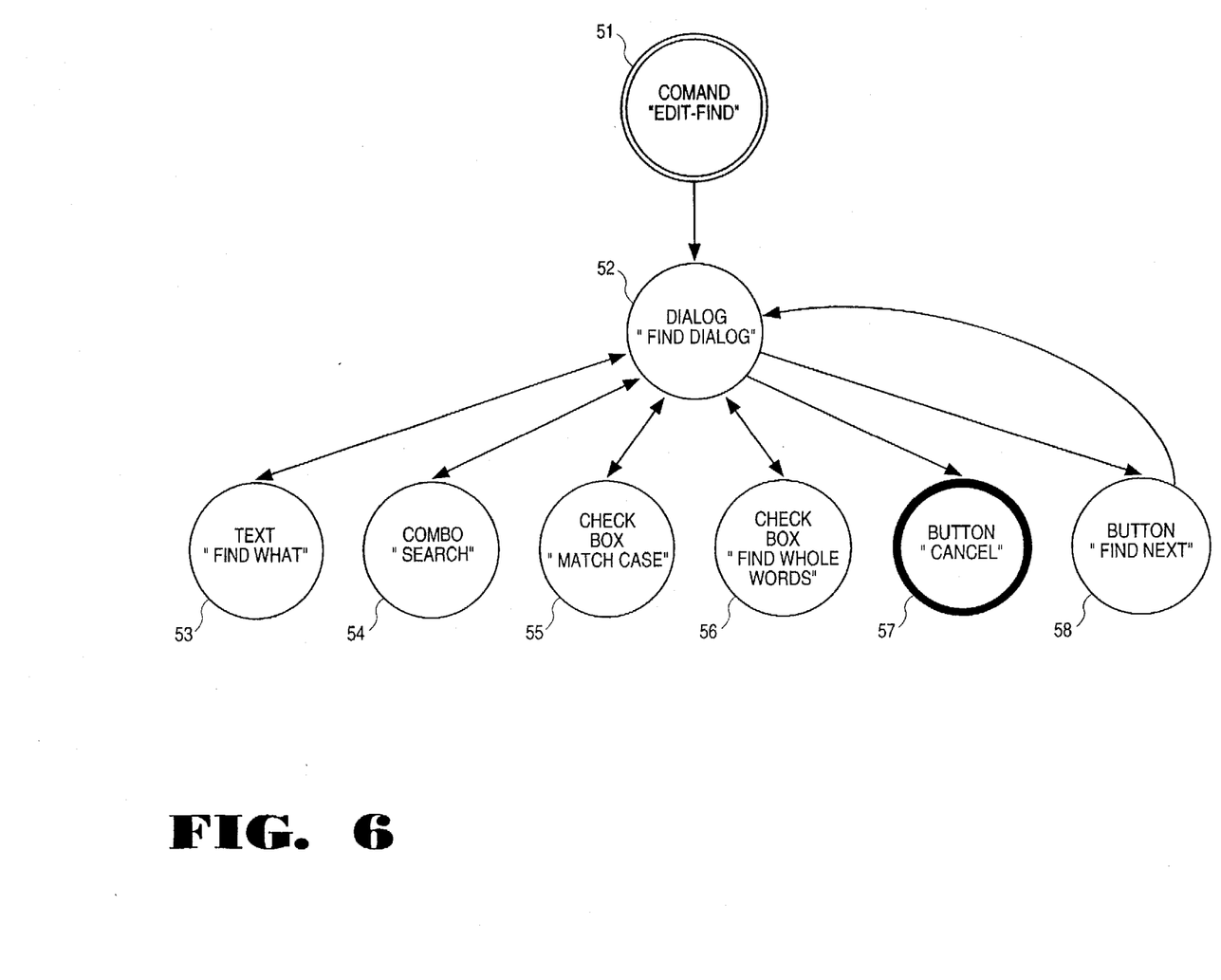
FIG. 6 is a graph illustrating a definition of a state machine for an "Edit-Find" command.

The behavior of the UI (or API) of the AUT 31 can be described by a set of state machines. Consequently, the test cases are generated from a set of state machine definitions describing the UI (or API) of the AUT 31. Each state machine definition can be represented as a directed graph consisting of states and transitions between states. If a UI is being driven, each state corresponds to a stable configuration of windows in which the AUT 31 is waiting for a user input. Each transition between states represents a potential user input that might be received at that point in time to select a new state. The state machine definitions are provided by a user and are stored in a dedicated database, as will be discussed below. FIG. 6, which is discussed further below, illustrates an example of a state machine definition for an Edit-Find command for a generic UI, from which various test cases can be generated.

A state machine approach may also be used to drive an API. In that case, the goal of the state machine is to determine which API calls to make in which order, and what their arguments should be. For an API state machine, each state corresponds to an API call that may be made. Begin and End states are defined arbitrarily, and every state is connected to the end state so that the test case may end after any API call. Unlike UI state machines, transitions need not represent any aspect of the test case in an API state machine. API state machines generally must reflect any order dependency requirements the API may have. For instance, in an API for dynamically allocating memory, one generally may not deallocate memory until it has been allocated. Therefore, the state machine must reflect the allocation call being made before the deallocation call. This limitation may be relaxed, however, if the API specification allows calls to be made out of sequence and does proper error recovery in those cases.

In the preferred embodiment, test cases created by the ASTT 25 are generated in BASIC (Beginner's All-purpose Symbolic Instruction Code) programming language. However, any conventional scripting language may be used. The state machine definitions can be provided in any structured definition language.

For mouse gestures, a state machine definition will capture the basic states and transitions required to perform a selection gesture in the AUT 31. These gestures might include gestures which select a tool and draw. For menu commands, a state machine definition will model the complete process of menu selection, filling in a dialog box, and command completion. For entering a name in a field, a state machine definition will include the possibility of editing keystrokes, such as backspace, delete, home or end, as well as pasting from a clipboard, etc.

Each test case must begin with a known state that is recognizable by the windows that exist in that state. Upon completion of each test case, the system must be in the same state it was in just before the test case was executed. Failure to return to the initial state is an error condition which will be reported by the ASTT 25. If such an error condition is reported, however, the ASTT 25 can cause the AUT 31 to enter a known state and then proceed to the next test case.

The ASTT 25 is capable of generating a script segment that emphasizes any given state of a state machine. The ASTT 25 stores a list of states and objects which may be incorporated into a state machine definition in an Object Class Library. The Object Class Library defines the behavior of each object type and contains information for synchronizing input to objects. Objects are identified in the Object Class Library by their type, as defined by the underlying operating system. For example, Microsoft's Windows operating system identifies object types by their window class. If the type of an object is not known by the underlying operating system and cannot be deduced by other means, the object can be aliased to an existing class if there is an existing class with similar behavior. Otherwise, a new class definition must be provided for the object. In the preferred embodiment, the Object Class Library is based on the standard object types of well-known programming languages, such as $C^{++}$ and Visual BASIC.

Figure 3:
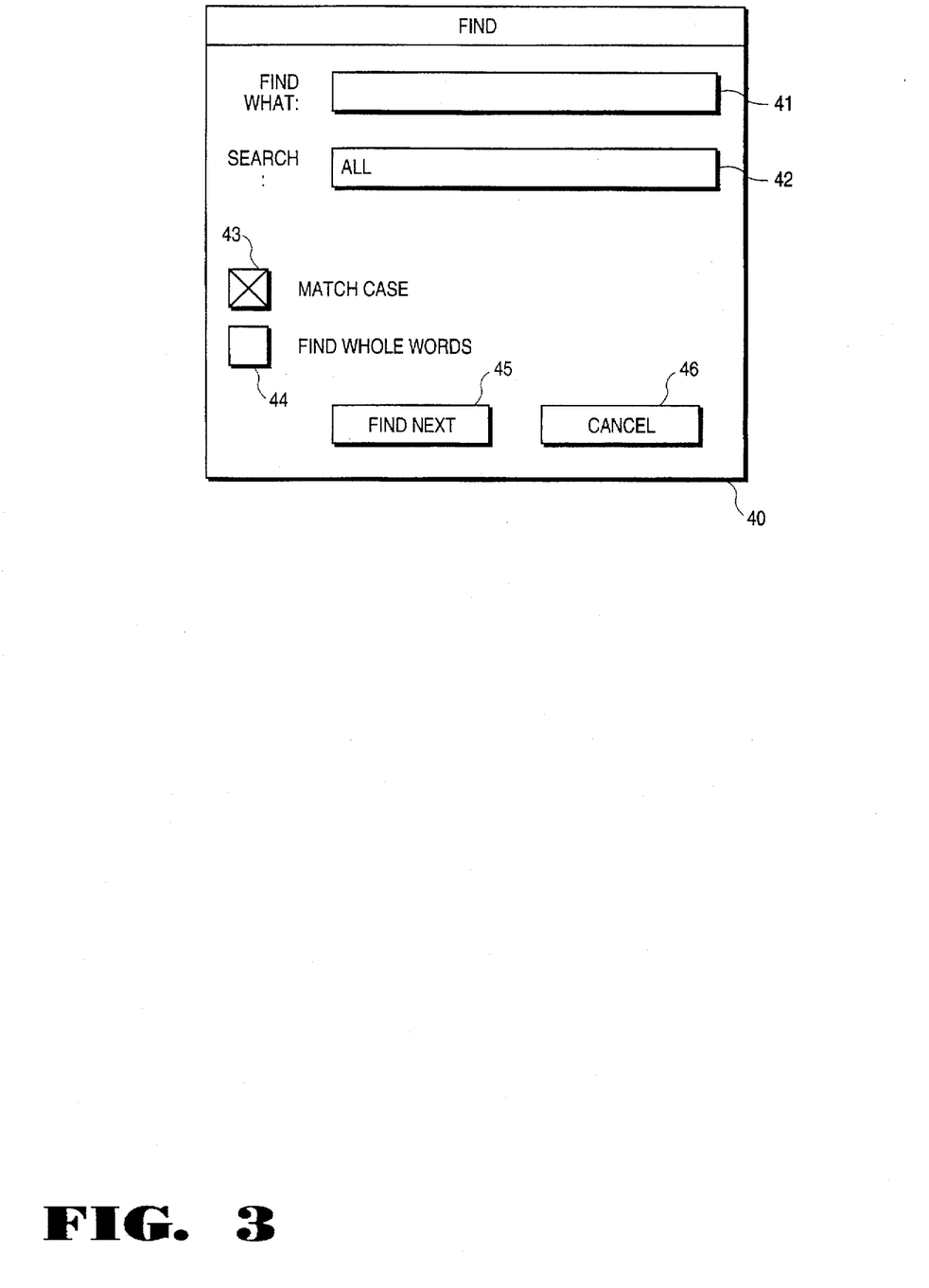
FIG. 3 illustrates a dialog box for an "Edit-Find" command.

FIGS. 3 and 6 illustrate a dialog box and a state machine definition, respectively, associated with an Edit-Find command. Referring now to FIG. 3, the Edit-Find dialog box 40 includes a "Find What" field 41, a "Search" field 42, a "Match Case" box 43, a "Find Whole Words" box 44, a "Find Next" button 45, and a "Cancel" button 46. The "Find What" field 41 and the "Search" field 42 accept alphanumerical characters as input. The characters are normally entered by a cursor being positioned in the field followed by characters being entered through a keyboard or the like. "Match Case" box 43 and "Find Whole Words" box 44 each can be checked or unchecked (toggled) using a mouse or other cursor control device. The "Find Next" button 45 and "Cancel" button 46 are "soft buttons" which can be actuated through user inputs entered using a cursor control device or a keyboard.

FIG. 6 illustrates a representation of a state machine definition for the Edit-Find command. A state machine definition can be represented as a directed graph of states and transitions, as mentioned above. The graph for the Edit-Find command includes nodes 51 through 58. Node 51 is a root node which represents selection of the Edit-Find command from a menu. Nodes 52 through 58 represent the various states within the Edit-Find command. A test case generator 81 (see FIG. 8) automatically selects a method for performing the Edit-Find menu pick (e.g., keyboard, mouse, etc.).

In FIG. 6, node 52 represents the open Edit-Find dialog box 40. Node 53 represents the "Find What" field 41. Note that the test case generator 82 determines what characters to enter into this field and automatically generates code to cause these characters to be entered when the script is executed. Node 54 represents the "Search" field 42. The "Search" field is a combination selection field. The test case generator 81 generates code to randomly select from the "Search" field 42. Node 55 represents the "Match Case" box 43, while node 56 represents the "Find Whole Words" box 44. The test case generator 81 randomly determines whether each of these boxes will be checked when the script is executed. Node 58 represents the "Find Next" button 45. In response to the "Find Next" state, the test case generator 81 produces a recursive call simulating the "Find Next" button being pressed. Node 57 corresponds to the "Cancel" button 46 and represents a terminal condition. The test case generator 81 generates script code to simulate the "Cancel" button 46 being pressed.

Figure 9:
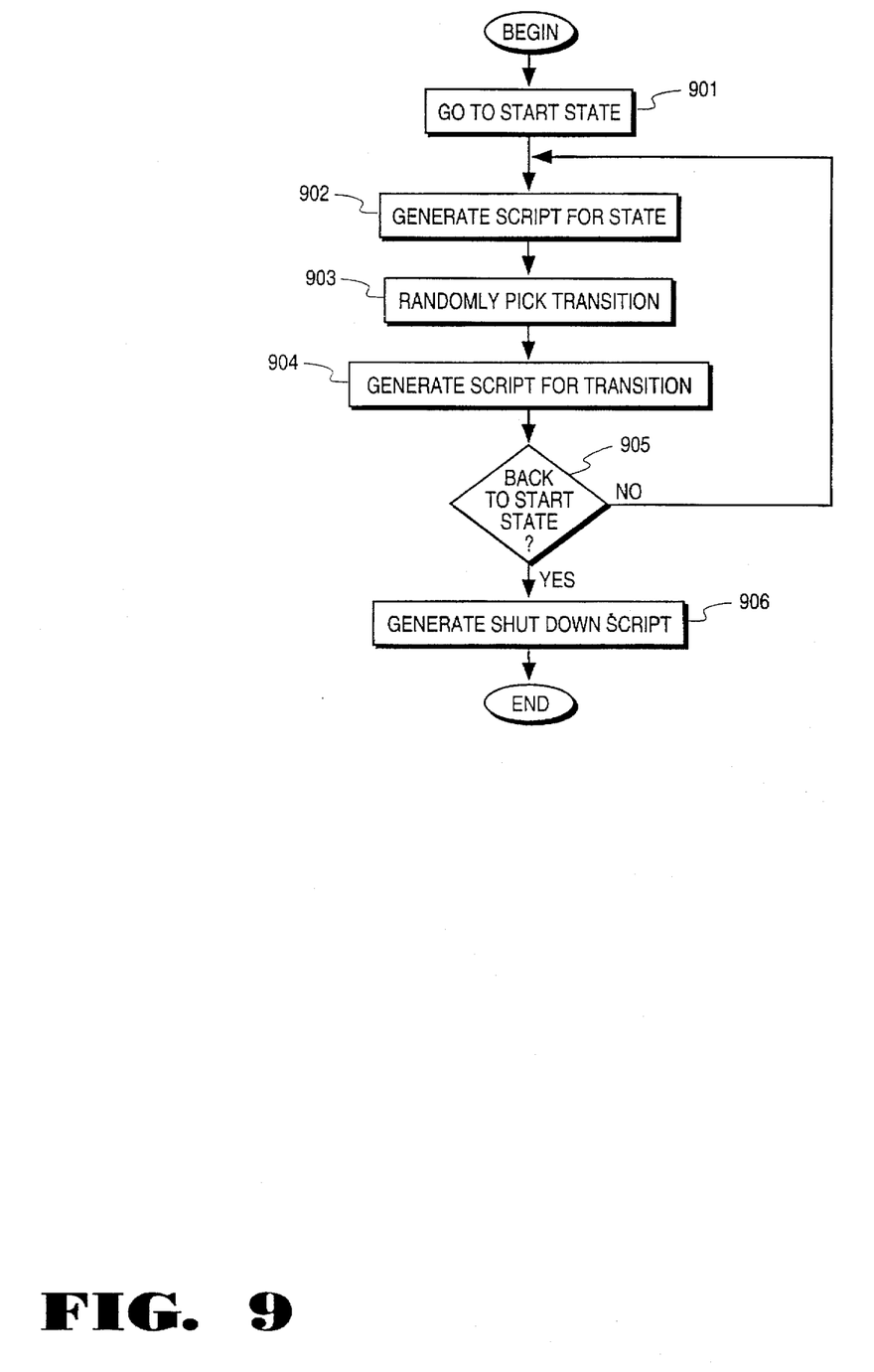
FIG. 9 is a flow diagram illustrating a technique of generating a test case from a state machine definition.

The following C++ code is an example of how the Edit-Find state machine definition of FIG. 6 can be represented in a form that is interpretable by the test case generator 81:

the start state (step 905), then steps 902 through 904 are repeated for the state to which the transition leads (step 905). If, however, the transition does lead back to the start state, then code for terminating the test case is generated (step 906). Note that because transitions are selected randomly, not every path is taken through the directed graph in every script.

In the preferred embodiment, the length of each test case is monitored as the test case is generated. If a test case grows too large, the program aborts, and the test case is discarded. This procedure prevents infinite loops from occurring during execution as a result of faulty test cases.

Figure 5:
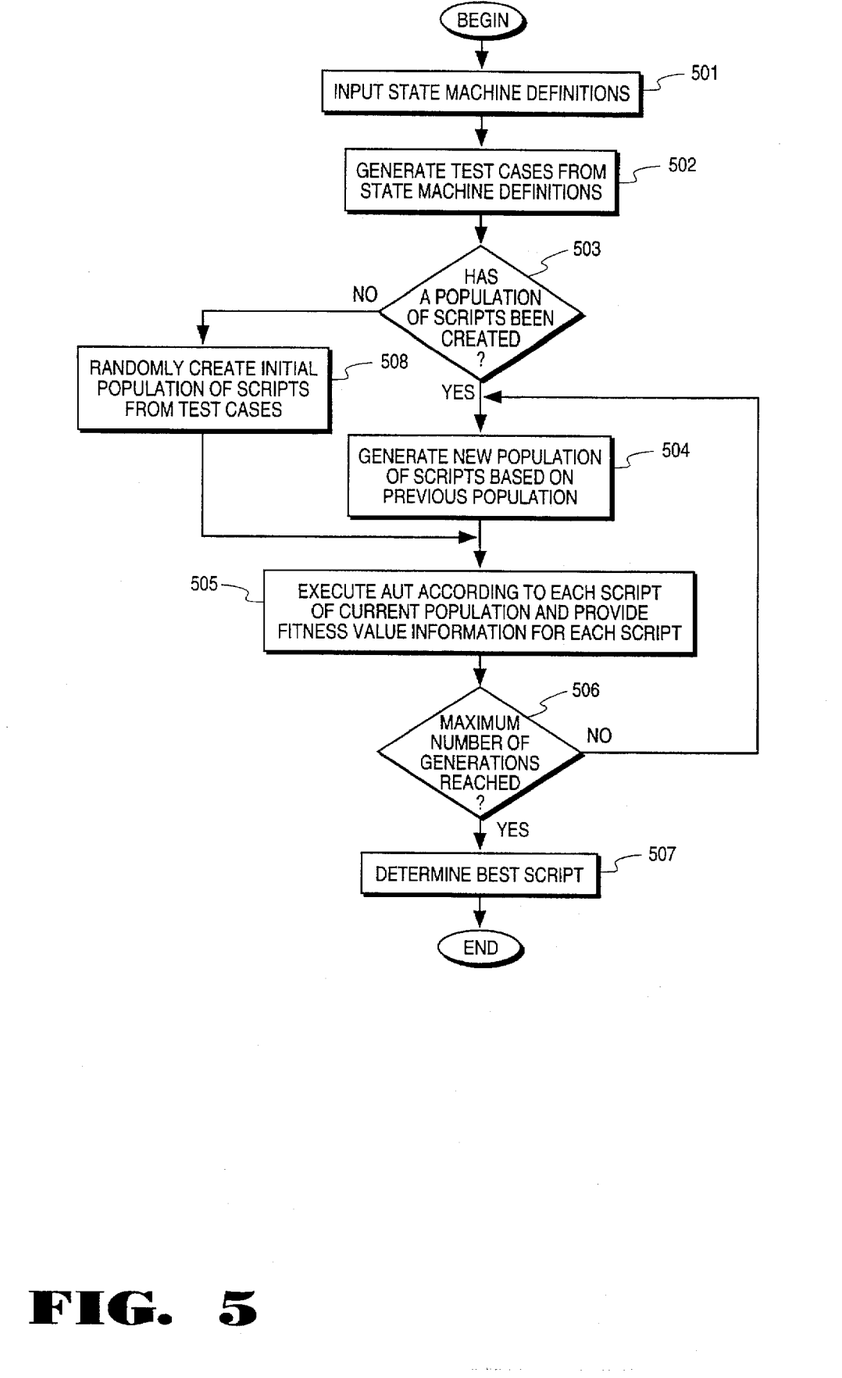
FIG. 5 is a flow diagram illustrating the overall procedure performed by an automatic software testing tool according to the present invention.

FIG. 5 is a flow diagram illustrating the overall procedure performed by the ASTT 25. Initially, a number of state machine definitions are provided to the ASTT 25 (step 501). As mentioned above, the state machine definitions describe

```
IGraph *BuildFindDialog()
{
        INode *igraph, *iparent, *ichild;
        IGraph *theGraph;
        theGraph = new IGraph;
        // Start with a TestScript node at the root.
        igraph = theGraph->newNode("TestScript", "EditFind");
        // Make its child a Command node.
        iparent = theGraph->newNode("Command", "EditFind");
        iparent = igraph->addChild( iparent );
        // Make the Command node's child a Dialog node.
        ichild = theGraph->newNode("Dialog", "FindDialog");
        iparent = iparent->addChild( ichild );
        // The Dialog has its controls as children.
        // Each control has the Dialog as its child.
        ichild = theGraph->addDialogCtl(iparent, "TextControl", "FindWhat");
        ichild = theGraph->addDialogCtl(iparent, "ComboControl", "Search");
        ichild = theGraph->addDialogCtl(iparent, "CheckBoxControl", "MatchCase")
        ichild = theGraph->addDialogCtl(iparent, "CheckBoxControl",
"FindWholeWords");
        ichild = theGraph->addDialogCtl(iparent, "ButtonControl", "FindNext");
        // Cancel ends the interaction, so its parent is the root.
        ichild = theGraph->addDialogCtlLeave (iparent, "ButtonControl," "Cancel",
igraph);
                return theGraph;
}
```

As mentioned above, each test case is generated from one of many state machine definitions stored in a dedicated database. To generate a test case, the test case generator 81 steps through a state machine definition, starting with the root node, using random chance to select transitions between states. Script code is generated for both states and transitions. Further, at each state in which data is to be entered, the test case generator 81 generates code to generate this data. Various methods may be used to determine the data, including random chance, predefined character strings, or the use of a genetic algorithm. (Note that the use of a genetic algorithm to generate input data is not to be confused with the use of a genetic algorithm to compose test scripts from test cases.) For example, a series of numbers might be used to test an integer field. Alternatively, data may be generated according to a user's preferences, which could be ascertained through a series of user prompts prior to executing the AUT 31.

FIG. 9 is a flow diagram illustrating the process performed by the test case generator of stepping through a state machine definition to generate a test case. Initially, the test case generator 81 enters a start state (step 901). Script code is then generated for that start state (step 902). Next, a transition leading away from the start state is randomly selected (step 903), and script code is generated to cause that transition (step 904). If the transition does not lead back to the functioning of the UI (or APIs) of the AUT 31. Next, the test case generator 81 generates a number of test cases from the state machine definitions (step 502). Then, if a population of test scripts has already been created (step 503), the genetic algorithm 30 generates a new population of test scripts based on the previous population (step 504). If a population has not yet been generated, then the genetic algorithm 30 randomly creates an initial population from the test cases (step 508). After each population of test scripts is generated, then the AUT 31 is executed according to each test script in the current population. In addition, a fitness measure, such as a code coverage value, is provided to the genetic algorithm for each test script (step 505). The process of generating populations of test scripts and executing the AUT 31 according to the test scripts is then repeated until the maximum number of generations has been created and applied to the AUT 31 (step 506). Finally, a best script of all the test scripts from all generations is then determined based on the fitness measures (step 507). Note that it may be desirable to determine the best script of each generation at intermediate stages of the process.

The genetic algorithm 30 is responsible for selecting the number of test cases for each particular test script, for selecting the particular test cases that will be included in each test script, and for selecting the ordering of test cases within each test script, in order to maximize code coverage while minimizing the number of test cases. The genetic algorithm 30 can also periodically request new test cases to incorporate into a script.

Figure 7:
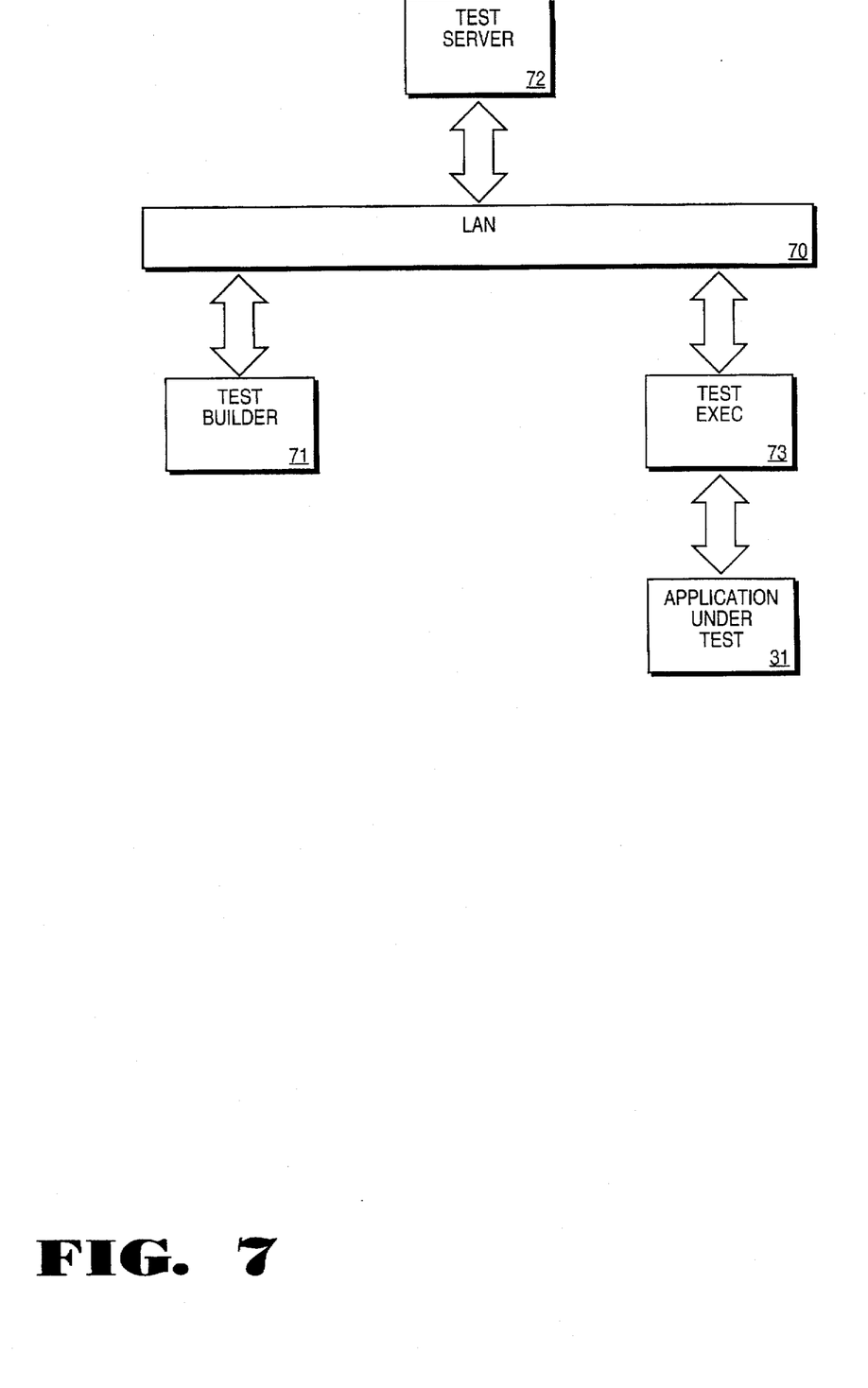
FIG. 7 illustrates a distributed architecture for implementing the present invention in a local area network.

FIG. 7 illustrates an embodiment of the present invention which utilizes an architecture that is distributed over a local area network (LAN). In this architecture, the ASTT 25 includes three distinct software modules, including a test builder 71, a test server 72, and a test executor 73. Test builder 71, test server 72, and test executor 73 are each implemented on a separate computer system, each of which may have the configuration depicted in FIG. 1. Test builder 71 is the main administration tool for the ASTT 25 and provides a user interface for quality engineers and developers who perform testing. Test server 72, which is implemented in an unattended server, is a central repository and control module of the distributed system. Test server 72 is controlled by the test builder 71 and queried by the test executor 73. Test executor 73 is also implemented in an unattended server and performs automated execution of test scripts.

Figure 8:
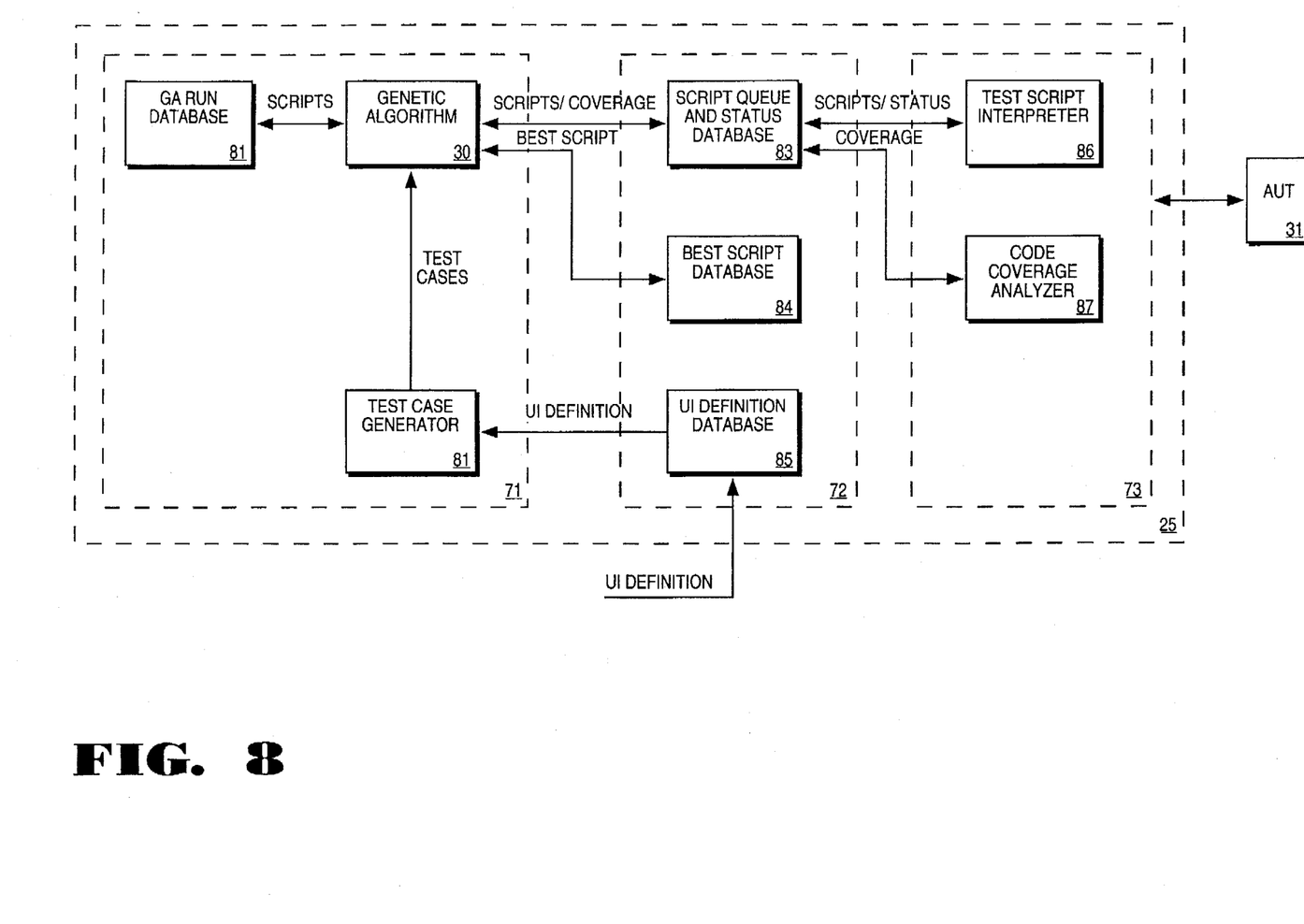
FIG. 8 illustrates in greater detail the distributed architecture for implementing the present invention shown in FIG. 7.

Referring now to FIG. 8, test builder 71, test server 72, and test executor 73 are illustrated in greater detail. Test builder 71 includes the genetic algorithm 30; the test case generator 81, and a GA run database 81, in which test scripts generated by the genetic algorithm 30 are stored. Test server 72 includes a UI definition database 85, which stores the state machine definitions. The state machine definitions stored in UI definition database 85 are provided to the test case generator 81, which interprets the state machine definitions to generate test cases. In addition, test server 72 includes a best script database 84, which receives an output of the genetic algorithm 30. In particular, the best script database 84 stores the best script of each population of test scripts (as determined by the genetic algorithm 30 based on the code coverage values). Test server 72 also includes a script queue and status database 83. Script queue and status database 83 receives test scripts from the genetic algorithm 30 and provides the test scripts to test executor 73. In addition, script queue and status database 83 receives code coverage values from the text executor 73 and provides these values to the genetic algorithm 30. Test executor 73 includes a test script interpreter 86 and a code coverage analyzer 87. Test executor 73 interfaces with the AUT 31 by executing the AUT 31 in response to each test script.

Figure 10:
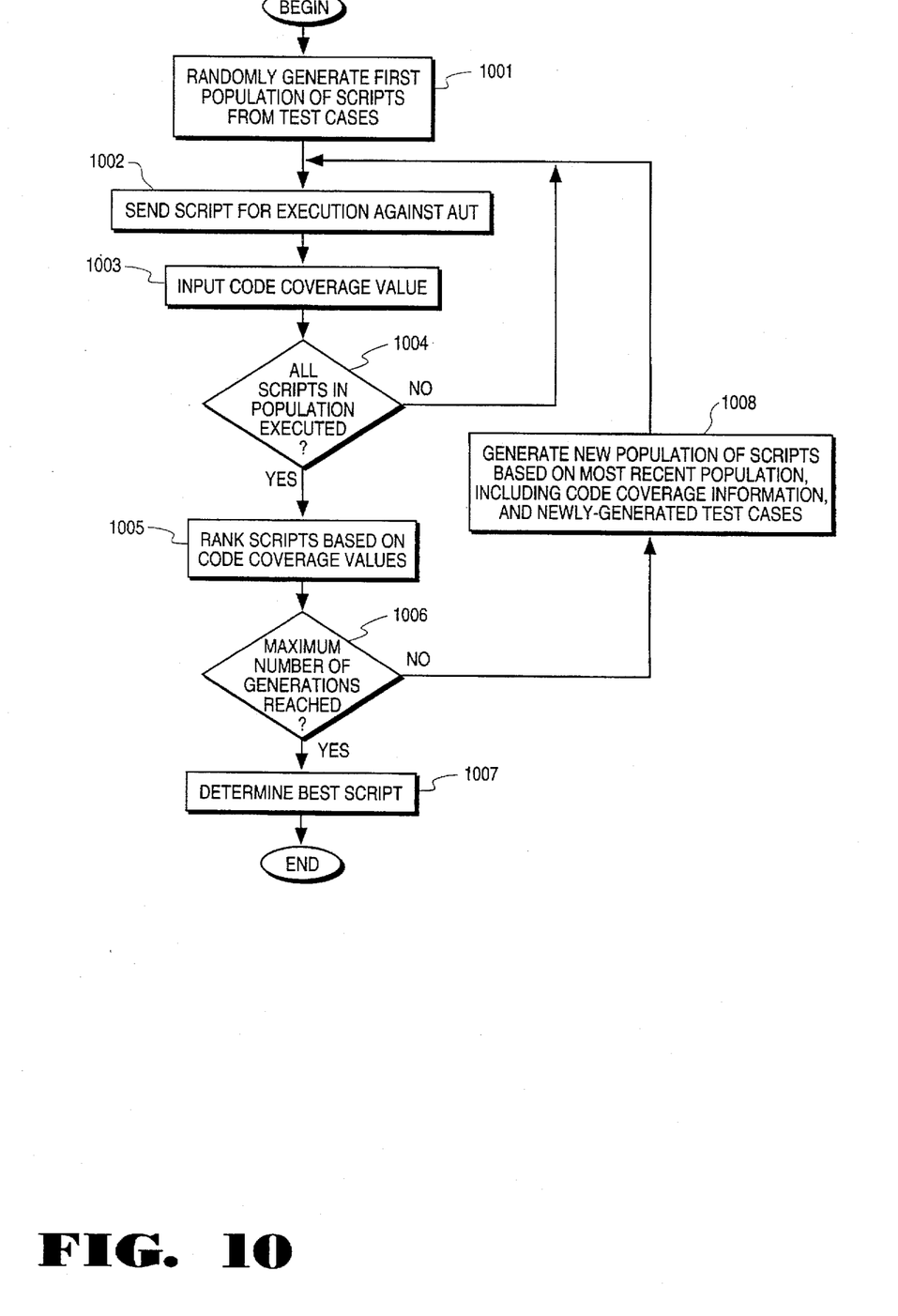
FIG. 10 is a flow diagram illustrating an overall technique by which the genetic algorithm generates populations of test scripts.

As already noted, the basic operation of the genetic algorithm 30 can be summarized as creating a population, running the population, ranking the population by fitness, and generating a new population. FIG. 10 illustrates the technique by which the genetic algorithm generates populations of test scripts. Initially, the genetic algorithm 30 randomly generates a first population of test scripts from the test cases provided by the test case generator 81 (step 1001). Each script in the population is then sent to the test script interpreter 86 for execution in conjunction with the AUT 31 (step 1002). As the execution of each test script is completed, the genetic algorithm 30 inputs a code coverage value generated by code coverage analyzer 87 (step 1003). After all scripts in the population are executed (step 1004), the scripts in the population are ranked based on the code coverage values (step 1005). Scripts which yielded greater code coverage will be ranked higher, since they are considered to be "fitter" (more fit). After the scripts in the population are ranked, a new population of scripts is generated by the genetic algorithm 30 from the most recent (ranked) population. In addition, the new population may be generated based on any newly generated test cases requested by the genetic algorithm 30. This process continues until the maximum number of generations has been created and applied to the AUT 31 (step 1006). After the maximum number of generations has been produced, the best script of all populations is determined based on the code coverage values (step 1007).

The number of test scripts in the initial population is determined empirically. Note that there is a trade-off between the number of generations required to obtain the best script and the number of members in each population. A smaller number of members in each population generally requires a greater number of generations to be produced. Hence, it is up to the designer to determine the best balance between these two considerations.

Figure 11:
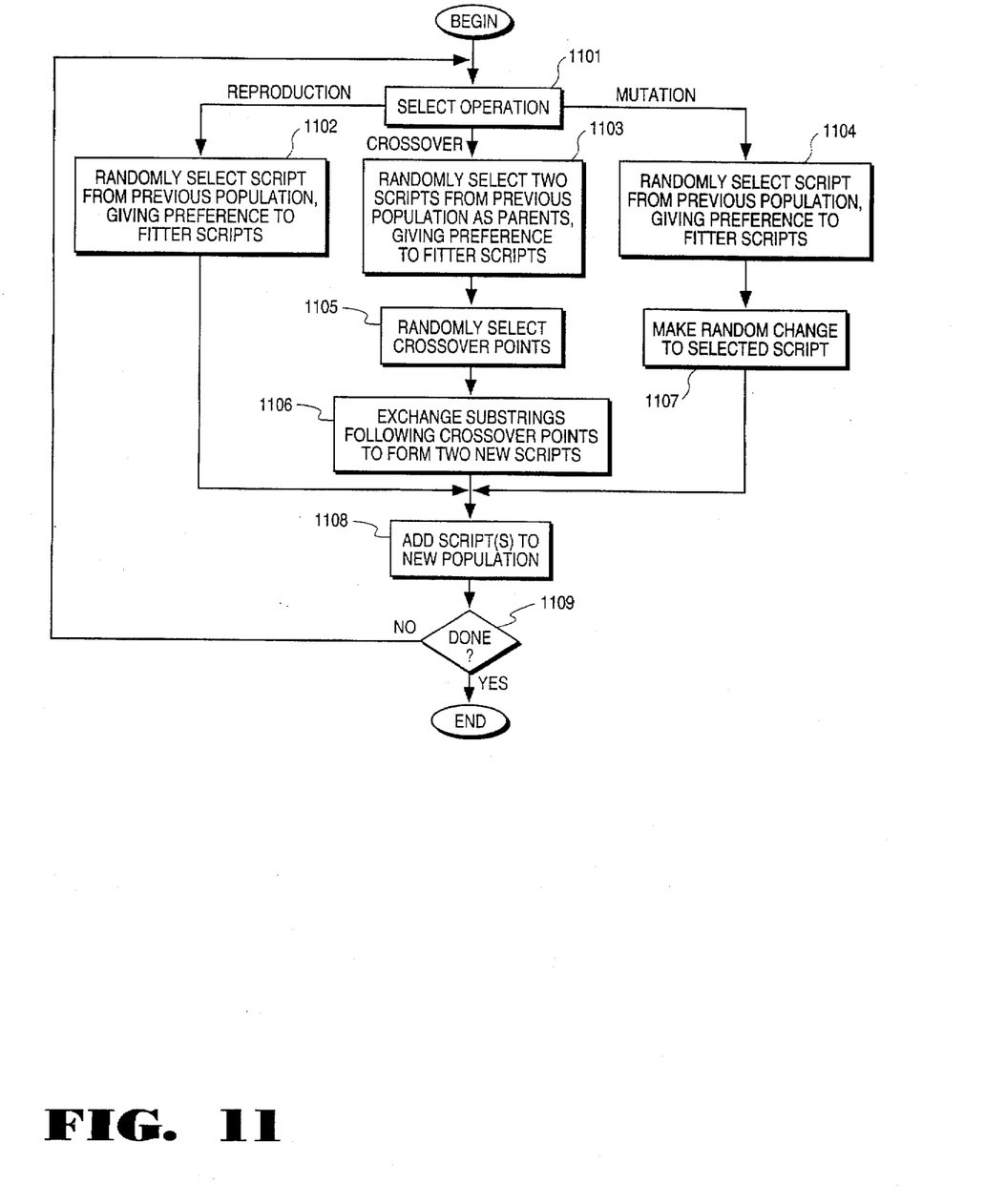
FIG. 11 is a flow diagram illustrating a technique by which a genetic algorithm generates a new population of test scripts.

FIG. 11 illustrates the procedure used by the genetic algorithm 30 to generate a new population. As already mentioned, the basic concepts of genetic algorithms are well-known. For each new member of the population, the genetic algorithm selects one of three possible operations: reproduction, crossover or mutation (step 1101). If the reproduction operation is selected, then the genetic algorithm 30 randomly selects a test script from the previous population and reproduces that test script into the new population (step 1108). Preference is given in making this selection to those scripts having higher fitness values (i.e., "fitter" scripts). If the crossover operation is selected, then the genetic algorithm 30 randomly selects two scripts from the previous population to be parents, giving preference to "fitter" scripts (step 1103). A random crossover point is selected in each of the two parent scripts (step 1105), and the substrings which follow the crossover points are exchanged in each script (step 1106). If mutation is selected, the genetic algorithm 30 randomly selects a script from the previous population, giving preference to fitter scripts (step 1104) and makes a random change to the selected script (step 1107). After the selected operation is completed, the new script or scripts are added to the new population (step 1108). The above process is then repeated until the new population is complete (step 1109).

Thus, an automatic software testing tool has been described. In particular, what has been described is a software testing tool which automatically generates a test script which gives high code coverage of the software under test while approaching a minimum possible script length. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative, rather than a restrictive, sense.

What is claimed is:

1. A method of testing machine-executable code, the code having a plurality of possible states, the method comprising:

generating a first set of input operations based on a definition of the states, each input operation including machine-executable instructions for causing the code to enter at least one of the states;

causing the code to be executed in response to the first set of input operations;

assigning a fitness value to each input operation based on a result of causing the code to be executed; and generating a second set of input operations from the first set of input operations based on the fitness values.

2. The method of claim 1, wherein the steps of generating the first set and generating the second set are performed according to a genetic algorithm.

3. The method of claim 2, wherein each of the input operations comprises a test script for testing the code.

4. The method of claim 1, wherein the code includes instructions for providing a user interface when executed by a processor, and wherein the step of generating a first set of input operations comprises the step of generating a set of operations for manipulating the user interface.

5. The method of claim 1, wherein the code includes an application program interface (API), and wherein the step of generating a first set of input operations comprises the step of generating a set of operations for manipulating the API.

6. The method of claim 1, wherein the fitness value corresponds to a measure of code coverage.

7. The method of claim 1, wherein the fitness value corresponds to a measure of data flow coverage.

8. A method of testing a software module including a plurality of machine-executable instructions, the software module including instructions for receiving a plurality of inputs when executed by a processor, the method comprising:

(a) inputting a definition of the instructions for receiving a plurality of inputs, the definition corresponding to a plurality of possible states of the software;

(b) generating a plurality of test cases from the definition, each test case including machine-executable instructions for producing at least one of the states in response to a test input;

(c) generating a first population of scripts, such that each script includes at least one of the test cases;

(d) causing the software module to be executed in response to each script;

(e) assigning a fitness value to each script based on execution of the software module according to the causing step; and (f) generating a new population of scripts based on the first population and the fitness values.

9. The method of claim 8, wherein steps (c) and (f) are performed according to a genetic algorithm.

10. The method of claim 8, wherein the step of generating a new population of scripts comprises the step of automatically generating a modified version of at least one of the scripts of the first population of scripts.

11. The method of claim 8, wherein the method comprises the step of performing a plurality of iterations of steps (d), (e), and (f) to generate a best script.

12. The method of claim 8, wherein the instructions for receiving a plurality of inputs comprises instructions for providing an application program interface (API) when executed by a processor.

13. The method of claim 8, wherein the step of inputting the definition of the instructions for receiving a plurality of inputs comprises the step of inputting a plurality of state machine definitions.

14. The method of claim 13 wherein the instructions for receiving a plurality of inputs comprises machine-executable instructions for providing a user interface.

15. The method of claim 8, wherein the step of generating a fitness value for each script comprises the step of generating, for each script, a code coverage value, each code coverage value corresponding to a number of the instructions of the software module that were executed during execution of the software module.

16. The method of claim 8, wherein the step of causing the software module to be executed comprises the step of causing the software module to be executed over a data set; and wherein the step of generating a fitness value for each script comprises the step of generating, for each script, a data flow coverage value, each data flow coverage value indicating a portion of the data set that was executed during execution of the software module.

17. The method of claim 8, wherein the software module is for implementation in a computer network including a client and a server, and wherein the step of generating a fitness value for each script comprises the step of generating a measure of a load placed upon the server for each script.

18. The method of claim 8, wherein the method further comprises the steps of:

modifying at least one of the instructions of the software module to cause a plurality of errors during execution of the software module; and generating the fitness value for each script based on the number of errors identified as a result of the software module being executed.

19. The method of claim 8, further comprising the step of automatically modifying at least one of the instructions of the software module to test a predetermined condition during execution of the software module.

20. A method of testing a software module, the software module having an input interface, the method comprising:

(a) inputting a definition of the input interface in terms of a plurality of state machines, each state machine having a plurality of logically interconnected states;

(b) generating from the state machines a plurality of test cases, wherein each test case includes a set of instructions representing a chronological sequence of states in one of the state machines and at least one test input for causing a transition between two states in the sequence;

(c) generating a first population of scripts, each script including a plurality of the test cases;

(d) causing the software application to be executed in response to each script of the first population;

(e) generating a fitness value for each script based on a result of the software module being executed in response to said script;

(f) ranking the scripts based on the fitness values;

(g) generating a new population of scripts based on a result of the ranking step; and (h) causing the software application to be executed in response to each script of the new population.

21. The method of claim 20, wherein the input interface is a user interface.

22. The method of claim 20, wherein the input interface is an application program interface (API).

23. The method of claim 20, further comprising the step of iterating steps (d) through (g) to generate a most-fit script.

24. The method of claim 20, further comprising the step of identifying a most-fit script from the new population of scripts.

25. The method of claim 20, wherein the software module includes a plurality of machine-executable instructions, and wherein each fitness value corresponds to a number of the instructions of the software application that were executed in response to the corresponding script.

26. The method of claim 20, wherein the step of generating a new population of scripts based on a result of the ranking step is performed using a genetic algorithm.

27. The method of claim 20, wherein the step of generating a fitness value for each script comprises the step of generating, for each script, a code coverage value.

28. The method of claim 20, wherein the step of causing the software module to be executed comprises the step of causing the software module to be executed over a data set; and wherein the step of generating a fitness value for each script comprises the step of generating, for each script, a data flow coverage value.

29. The method of claim 20, wherein the software module is for implementation in a computer network including a client and a server, and wherein the step of generating a fitness value for each script comprises the step of generating a measure of a load placed upon the server for each script.

30. The method of claim 20, wherein the method further comprises the steps of:

modifying at least one of the instructions of the software module to cause a plurality of errors during execution of the software module; and generating the fitness value for each script based on the number of errors identified as a result of the software module being executed.

31. The method of claim 20, further comprising the step of automatically modifying at least one of the instructions of the software module to test a predetermined condition during execution of the software module.

32. A program storage device readable by a machine, the program storage device tangibly embodying a program of instructions executable by the machine to perform steps for testing a test software module, the steps comprising:

building a dynamically generated test script from a population of test cases;

inputting the test script to the test software module for execution by the test software module;

generating a fitness score corresponding to the test script by comparing a result of execution of the test script with a predefined fitness attribute; and using the fitness score to modify the test script for a subsequent iteration of the inputting step.

33. The program storage device of claim 32, wherein the steps of building a dynamically generated test script, generating a fitness score, and using the fitness score, are performed using a genetic algorithm.

34. The program storage device of claim 32, wherein the population of test cases includes operators for manipulating a user interface of the test software module.

35. The program storage device of claim 32, wherein the population of test cases includes operators for manipulating an application program interface (API) of the test software module.

36. The program storage device of claim 32, wherein the predefined fitness attribute comprises a code coverage attribute.

37. The program storage device of claim 32, wherein the predefined fitness attribute corresponds to a measure of data flow coverage.

38. The program storage device of claim 32, wherein each of the input operations comprises a test script for testing the software module.

39. A program storage device readable by a machine, the program storage device tangibly embodying a program of instructions executable by the machine to perform steps for testing software, the software including code for receiving a plurality of inputs when executed by a processor, the steps comprising:

(a) inputting a definition of the code for receiving the plurality of inputs, the definition corresponding to a plurality of possible states of the software;

(b) generating a plurality of test cases from the definition, each test case including machine-executable instructions for producing at least one of the states in response to a test input;

(c) using a genetic algorithm to generate a population of scripts for testing the software, each script including at least one of the test cases;

(d) causing the software to be executed in response to the scripts of the first population of scripts;

(e) generating a fitness value for each script based on execution of the software; and (e) using the genetic algorithm to generate a second population of scripts based on the fitness values.

40. The program storage device of claim 39, wherein the code for receiving a plurality of inputs comprises an application program interface (API).

41. The program storage device of claim 39, wherein the code for receiving a plurality of inputs comprises code for providing a user interface when executed by a processor.

42. The program storage device of claim 39, wherein the fitness value corresponds to a code coverage attribute.

43. The program storage device of claim 39, wherein the fitness value corresponds to a data flow coverage attribute.

44. A device for testing a software module, the software module including code for providing an input interface when executed by a processor, the software module having a plurality of possible states, the device comprising:

a test case generator coupled to receive a definition of the states, the test case generator generating a plurality of test cases based on the definition of the states, each test case including instructions for causing the software module to enter at least one of the states;

a test script generator coupled to receive the test cases, the test script generator dynamically generating a first population of scripts, each script of the first population of scripts including at least one of the test cases, the script generator coupled to provide each of the test scripts to the software module as input to the input interface during execution by the processor;

a test script evaluator coupled to receive output from the software module during execution by the processor, the script generator generating a plurality of fitness values in response to the software module being executed, one fitness value for each script, the test script evaluator providing the fitness values to the test script generator; and wherein the test script generator further dynamically generates at least one new population of scripts based on a previous population of scripts and a plurality of fitness values associated with the previous population of scripts.

45. The device of claim 44, wherein the test script generator further determines a best script.

46. The device of claim 44, wherein the test script generator comprises a genetic algorithm.

47. The device of claim 44, wherein the input interface is an application program interface (API).

48. The device of claim 44, wherein the fitness value corresponds to a code coverage attribute.

* * * * *